(12) United States Patent
Roh et al.

(10) Patent No.: US 9,088,036 B2
(45) Date of Patent: Jul. 21, 2015

(54) RECHARGEABLE LITHIUM BATTERY

(75) Inventors: Sae-Weon Roh, Yongin-si (KR); In-Tae Mun, Yongin-si (KR); Eui-Hwan Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1654 days.

(21) Appl. No.: 11/757,298

(22) Filed: Jun. 1, 2007

(65) Prior Publication Data
US 2008/0138713 A1 Jun. 12, 2008

(30) Foreign Application Priority Data

Dec. 12, 2006 (KR) ........................ 10-2006-0126257

(51) Int. Cl.
| | |
|---|---|
| *H01M 4/131* | (2010.01) |
| *H01M 4/583* | (2010.01) |
| *H01M 4/587* | (2010.01) |
| *H01M 4/13* | (2010.01) |
| *H01M 10/052* | (2010.01) |
| *H01M 10/0569* | (2010.01) |
| *H01M 4/02* | (2006.01) |
| *H01M 10/0525* | (2010.01) |

(52) U.S. Cl.
CPC ................ *H01M 4/131* (2013.01); *H01M 4/13* (2013.01); *H01M 4/583* (2013.01); *H01M 4/587* (2013.01); *H01M 10/052* (2013.01); *H01M 10/0569* (2013.01); *H01M 10/0525* (2013.01); *H01M 2004/027* (2013.01); *H01M 2004/028* (2013.01); *H01M 2300/004* (2013.01); *H01M 2300/0037* (2013.01); *Y02E 60/122* (2013.01)

(58) Field of Classification Search
CPC ................ H01M 2004/028; H01M 2004/027; H01M 2004/021; H01M 2300/0037; H01M 2300/004; H01M 4/131; H01M 4/105; H01M 4/525; H01M 4/583; H01M 4/587; H01M 4/13; H01M 10/0525; H01M 10/0568; H01M 10/0569; Y02E 60/122
USPC ............. 429/231.1, 231.2, 231.3, 231.5, 224, 429/231.6, 231.95, 231.8, 332, 331
See application file for complete search history.

(56) References Cited

U.S. PATENT DOCUMENTS

| | | | |
|---|---|---|---|
| 5,521,027 A * | 5/1996 | Okuno et al. ............... 429/231.3 |
| 5,525,443 A * | 6/1996 | Okuno et al. ............... 429/231.1 |
| 6,927,001 B1 | 8/2005 | Hamamoto et al. | |
| 7,438,994 B2 * | 10/2008 | Muraoka et al. ............ 429/231.1 |
| 7,521,151 B2 * | 4/2009 | Hwang et al. ............. 429/231.95 |
| 2002/0037450 A1 * | 3/2002 | Suzuki et al. ................. 429/232 |
| 2004/0023115 A1 | 2/2004 | Kato et al. | |
| 2005/0069767 A1 * | 3/2005 | Tsunekawa et al. .......... 429/209 |
| 2005/0069775 A1 * | 3/2005 | Hwang et al. ............. 429/231.95 |
| 2006/0078787 A1 * | 4/2006 | Sato et al. ........................ 429/62 |
| 2006/0222937 A1 * | 10/2006 | Morimoto et al. ............ 429/164 |

FOREIGN PATENT DOCUMENTS

| | | |
|---|---|---|
| CN | 1277468 A | 12/2000 |
| EP | 1 521 317 A2 | 4/2005 |
| EP | 1 598 895 A1 | 11/2005 |
| EP | 1 729 365 A1 | 12/2006 |
| JP | 2000-340232 | 12/2000 |
| JP | 2001-266876 | 9/2001 |
| JP | 2003-282048 A | 10/2003 |
| JP | 2005-339970 | 12/2005 |
| JP | 2006-236725 | 9/2006 |
| JP | 2006-278265 | 10/2006 |
| JP | 2006-294482 | 10/2006 |
| KR | 10-2001-0001626 A | 1/2001 |
| KR | 10-2002-0085969 A | 11/2002 |
| KR | 10-2004-0048912 A | 6/2004 |
| KR | 10-2005-0030440 A | 3/2005 |
| WO | WO 2005091422 A1 * | 9/2005 |

OTHER PUBLICATIONS

Machine Translation of KR2002-0085969 dated Nov. 18, 2002.*
Japanese Office action dated Aug. 10, 2010, for corresponding Japanese Patent application 2007-098482, noting listed references in this IDS.
European Search Report dated Sep. 10, 2007 for corresponding European Patent Application No. 07110033.3.
KIPO Office action dated Sep. 30, 2009 in the priority Korean application No. 10-2006-0126257, listing the cited references in this IDS.
SIPO Certificate of Patent daed Mar. 7, 2012, for corresponding Chinese Patent application 200710112566.3, 20 pages.

\* cited by examiner

*Primary Examiner* — Laura Weiner
(74) *Attorney, Agent, or Firm* — Christie, Parker & Hale, LLP

(57) ABSTRACT

A rechargeable lithium battery is provided that includes a negative electrode including a negative active material, a positive electrode including a positive active material, and an electrolyte. The electrolyte includes a lithium salt and a non-aqueous organic solvent including from about 1 to about 20 volume % of a cyclic carbonate and from about 80 to about 99 volume % of a linear carbonate. The positive electrode has an active mass density of about 3.7 g/cc or greater. The rechargeable lithium battery shows improved cycle-life and storage characteristics at high temperatures, and good high rate characteristics.

13 Claims, 3 Drawing Sheets

RECHARGEABLE LITHIUM BATTERY

CROSS-REFERENCE TO RELATED APPLICATION

This application claims priority to and the benefit of Korean Patent Application No. 10-2006-0126257 filed in the Korean Intellectual Property Office on Dec. 12, 2006, the entire content of which is incorporated herein by reference.

BACKGROUND OF THE INVENTION (a) Field of the Invention

The present invention relates to rechargeable lithium batteries.

(b) Description of the Related Art

In recent times, portable electronic equipment has reduced in size and weight in accordance with developments in electronics industries. As a result, these portable electronic devices are being increasingly used. Batteries having high energy density are needed as power sources for such portable electronic equipment, and rechargeable lithium batteries have been actively researched for this purpose.

Lithium-transition element oxides have been used as positive active materials for rechargeable lithium batteries, and crystalline or amorphous carbon-based active materials or carbon composites have been used as negative active materials. The active materials are coated on a current collector to an appropriate thickness and length. Alternatively, the active materials are made into a film. In either case, the active materials are used to fabricate electrodes, which are then wound or stacked with an insulating separator positioned between the electrodes to fabricate an electrode assembly. The electrode assembly is put into a can or other case and an electrolyte is injected therein to fabricate a rechargeable battery.

Recently, the demand for high-capacity and high voltage rechargeable lithium batteries has significantly increased, but rechargeable lithium batteries having sufficient performance and stability when used at high voltages of over 4.2V have not yet been developed.

SUMMARY OF THE INVENTION

One embodiment of the present invention provides a rechargeable lithium battery having improved high temperature cycle-life, high temperature storage characteristics, and high rate characteristics.

According to one embodiment of the present invention, a rechargeable lithium battery includes a negative electrode including a negative active material, a positive electrode including a positive active material, and an electrolyte. The electrolyte includes a lithium salt and a non-aqueous organic solvent that includes from about 1 to about 20 volume % of a cyclic carbonate and from about 80 to about 99 volume % of a linear carbonate.

The positive electrode may have an active mass density of about 3.7 g/cc or greater. According to one embodiment of the present invention, the positive electrode has an active mass density ranging from about 3.7 to about 3.9 g/cc. According to another embodiment, the positive electrode has an active mass density ranging from about 3.7 to about 4.2 g/cc.

The negative electrode may have an active mass density of about 1.5 g/cc or greater. According to one embodiment of the present invention, the negative electrode has an active mass density ranging from about 1.5 to about 1.9 g/cc.

The rechargeable lithium battery may have a charge cut-off voltage ranging from about 4.2 to about 4.5V. According to one embodiment of the present invention, the rechargeable lithium battery has a charge cut-off voltage ranging from about 4.3 to about 4.5V.

According to one embodiment, the electrolyte includes from about 5 to about 15 volume % of a cyclic carbonate and from about 85 to about 95 volume % of a linear carbonate. Nonlimiting examples of suitable cyclic carbonates include ethylene carbonate, propylene carbonate, butylene carbonate, vinyl carbonate, vinylethylene carbonate, and mixtures thereof. Nonlimiting examples of suitable linear carbonates includes dimethyl carbonate, diethyl carbonate, dipropyl carbonate, methylpropyl carbonate, ethylpropyl carbonate, methylethyl carbonate, ethylmethyl carbonate, and mixtures thereof.

BRIEF DESCRIPTION OF THE DRAWINGS

These and other features and advantages of the present invention will be better understood by reference to the following detailed description when considered in conjunction with the attached drawings in which.

DETAILED DESCRIPTION OF THE INVENTION

Figure 1:
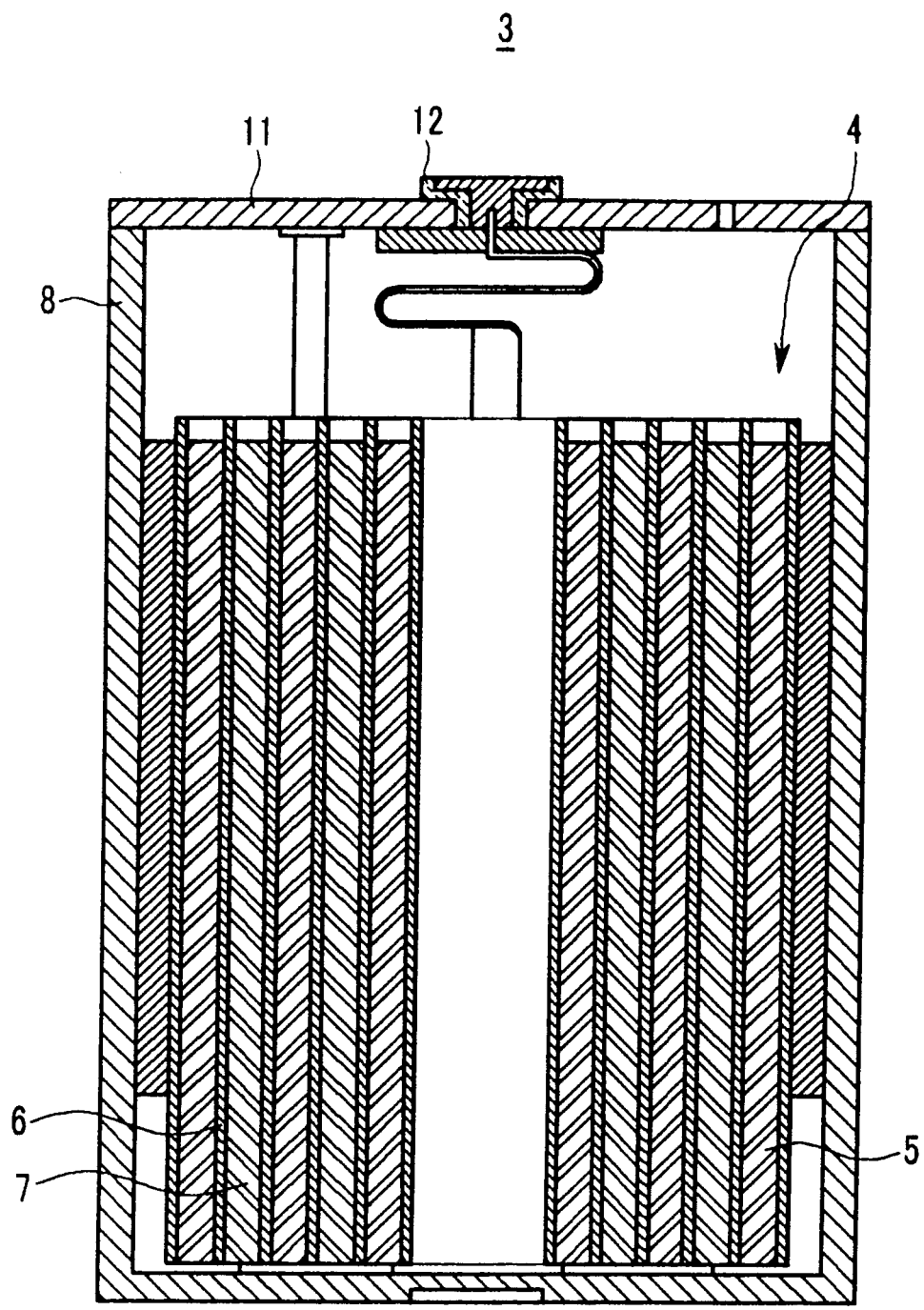
FIG. 1 is a schematic cross-sectional view of a rechargeable lithium battery according to one embodiment of the present invention.

Recent demand for rechargeable lithium batteries with high voltages and high capacities has sharply increased. Accordingly, development of rechargeable lithium batteries with high capacities has been undertaken by increasing the active mass density of an electrode. However, when a conventional electrolyte is inserted into a high voltage and high capacity rechargeable lithium battery having a high active mass density, it can generate gas due to thermal instability of the conventional electrolyte. The generated gas increases the internal pressure of the battery, opening a current interrupt device (hereinafter, referred to as a CID) and thereby stopping operation of the battery. In extreme cases, the generated gas causes a negative reaction between the electrolyte and an active material on the surface of the positive or negative electrode, thereby deteriorating the battery.

In addition, when a high voltage, high-capacity rechargeable lithium battery is allowed to stand at a high temperature (about 90° C.) or at a temperature of 60° C. or greater for a long time, the CID opens, stopping operation of the battery.

One embodiment of the present invention provides a rechargeable lithium battery having improved cycle-life and storage characteristics at high temperatures, and improved high-rate characteristics.

A rechargeable lithium battery according to one embodiment of the present invention includes a negative electrode including a negative active material, a positive electrode including a positive active material, and an electrolyte. The positive electrode has an active mass density of about 3.7 g/cc or greater. According to one embodiment of the present invention, the positive electrode has an active mass density ranging from about 3.7 to about 4.2 g/cc. According to another embodiment of the present invention, the positive electrode has an active mass density ranging from about 3.7 to about 3.9 g/cc. When the positive electrode has a high active mass density of about 3.7 g/cc or greater, the rechargeable lithium battery may have high capacity.

The negative electrode may have an active mass density of about 1.5 g/cc or greater. According to one embodiment of the present invention, the negative electrode has an active mass density ranging from about 1.5 to about 1.9 g/cc. According to another embodiment of the present invention, the negative electrode has an active mass density ranging from about 1.5 to about 1.8 g/cc. When the negative electrode has an active mass density of about 1.5 g/cc or greater, the rechargeable lithium battery may have high capacity.

The rechargeable lithium battery may have a charge cut-off voltage ranging from about 4.2 to about 4.5V. According to one embodiment of the present invention, the rechargeable lithium battery has a charge cut-off voltage ranging from about 4.3 to about 4.5V.

The electrolyte may include a lithium salt and a non-aqueous organic solvent including from about 1 to about 20 volume % of a cyclic carbonate and from about 80 to about 99 volume % of a linear carbonate. According to one embodiment of the present invention, the electrolyte includes from about 5 to about 15 volume % of a cyclic carbonate and from about 85 to about 95 volume % of a linear carbonate. When the cyclic carbonate is included in an amount ranging from about 1 to about 20 volume %, the electrolyte may have relatively low viscosity. In addition, since the cyclic carbonate is electrochemically unstable at a high charge cut-off voltage ranging from about 4.2 to about 4.5V, it may have decreased energy for electrochemical stabilization, thereby improving high temperature cycle-life characteristics, high temperature storage characteristics, and high rate characteristics. When the cyclic carbonate is included in an amount less than about 1 volume % or more than about 20 volume %, the battery may have problems. For example, when the battery is allowed to stand for a long time, it may have increased gas generation, which leads to the opening a vent of the cap assembly. In addition, the battery may have decreased capacity retention and recovery, thereby deteriorating the cycle-life characteristics, and particularly, sharply decreased cycle-life characteristics at high temperatures of greater than 45° C.

Nonlimiting examples of suitable cyclic carbonates include ethylene carbonate, propylene carbonate, butylene carbonate, vinyl carbonate, vinylethylene carbonate, and mixtures thereof. According to one embodiment, the cyclic carbonate is ethylene carbonate.

Nonlimiting examples of suitable linear carbonates include dimethyl carbonate, diethyl carbonate, dipropyl carbonate, methylpropyl carbonate, ethylpropyl carbonate, methylethyl carbonate, ethylmethyl carbonate, and mixtures thereof. According to one embodiment, the linear carbonate is ethylmethyl carbonate or dimethyl carbonate.

According to one embodiment of the present invention, the non-aqueous organic solvent of the electrolyte includes a mixture of ethylene carbonate, ethylmethyl carbonate, and dimethyl carbonate.

The electrolyte also includes a lithium salt. Nonlimiting examples of suitable lithium salts include $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bis(oxalato) borate; LiBOB) and combinations thereof.

The negative electrode includes a current collector and a negative active material layer disposed on the current collector, the negative active material layer including a negative active material. The negative active material may include a material capable of alloying with lithium, a carbonaceous material, or a composite material including a material capable of alloying with lithium and a carbonaceous material. Nonlimiting examples of suitable materials capable of alloying with lithium include Al, Si, Sn, Pb, Zn, Bi, In, Mg, Ga, Cd, Ag, Ge, and Ti. Lithium metal may also be used for the negative active material.

The carbonaceous material may be amorphous carbon or crystalline carbon. The crystalline carbon may include plate-shaped, spherical, or fiber-shaped natural or artificial graphite, graphitized carbon fibers, graphitized mesocarbon microbeads, and so on. The amorphous carbon may be soft carbon (carbon obtained by sintering at a low temperature), or a hard carbon (carbon obtained by sintering at a high temperature)

According to one embodiment of the present invention, the negative electrode may be fabricated by first preparing a negative active material composition by mixing a negative active material, a binder, and optionally a conductive agent. The composition is then applied on a negative current collector followed by drying and compressing. The negative electrode manufacturing method is well known, and thus it is not described in detail.

Nonlimiting examples of suitable binders include polyvinylalcohol, carboxymethyl cellulose, hydroxypropylene cellulose, diacetylene cellulose, polyvinylchloride, polyvinylpyrrolidone, polytetrafluoroethylene, polyvinylidene fluoride, polyethylene, and polypropylene.

The conductive agent may be any electrically conductive material that has electrical conductivity and chemical stability. Nonlimiting examples of suitable conductive agents include natural graphite, artificial graphite, carbon black, acetylene black, ketjen black, carbon fibers, metal powders, metal fibers including copper, nickel, aluminum, silver, and so on, and polyphenylene derivatives.

One nonlimiting example of a suitable solvent is N-methylpyrrolidone.

Nonlimiting examples of suitable current collectors include copper foils, nickel foils, stainless steel foils, titanium foils, nickel foams, copper foams, polymer substrates coated with conductive metals, and combinations thereof.

In one embodiment of the present invention, the positive electrode includes a positive active material that may be a composite oxide including lithium and a metal such as cobalt, manganese, nickel, and combinations thereof. The composite oxide may be a compound selected from compounds represented by Formulas 1 to 24, below.

$$Li_aA_{1-b}B_bD_2 \qquad \text{(Formula 1)}$$

In Formula 1, $0.95 \leq a \leq 1.1$ and $0 \leq b \leq 0.5$.

$$Li_aE_{1-b}B_bO_{2-c}F_c \qquad \text{(Formula 2)}$$

In Formula 2, $0.95 \leq a \leq 1.1$, $0 \leq b \leq 0.5$, and $0 \leq c \leq 0.05$.

$$LiE_{2-b}B_bO_{4-c}F_c \qquad \text{(Formula 3)}$$

In Formula 3, $0 \leq b \leq 0.5$ and $0 \leq c \leq 0.05$.

$$Li_aNi_{1-b-c}Co_bB_cD_\alpha \qquad \text{(Formula 4)}$$

In Formula 4, $0.95 \leq a \leq 1.1$, $0 \leq b \leq 0.5$, $0 \leq c \leq 0.05$, and $0 \leq \alpha \leq 2$.

$$Li_aNi_{1-b-c}Co_bB_cO_{2-\alpha}F_\alpha \qquad \text{(Formula 5)}$$

In Formula 5, $0.95 \leq a \leq 1.1$, $0 \leq b \leq 0.5$, $0 \leq c \leq 0.05$, and $0 \leq \alpha \leq 2$.

$$Li_aNi_{1-b-c}Co_bB_cO_{2-\alpha}F_2 \qquad \text{(Formula 6)}$$

In Formula 6, $0.95 \leq a \leq 1.1$, $0 \leq b \leq 0.5$, $0 \leq c \leq 0.05$, and $0 \leq \alpha \leq 2$.

$$Li_aNi_{1-b-c}Mn_bB_cD_\alpha \qquad \text{(Formula 7)}$$

In Formula 7, $0.95 \leq a \leq 1.1$, $0 \leq b \leq 0.5$, $0 \leq c \leq 0.05$, and $0 \leq \alpha \leq 2$.

$$Li_aNi_{1-b-c}Mn_bB_cO_{2-\alpha}F_\alpha \quad \text{(Formula 8)}$$

In Formula 8, $0.95 \le a \le 1.1$, $0 \le b \le 0.5$, $0 \le c \le 0.05$, and $0 \le \alpha \le 2$.

$$Li_aNi_{1-b-c}Mn_bB_cO_{2-\alpha}F_2 \quad \text{(Formula 9)}$$

In Formula 9, $0.95 \le a \le 1.1$, $0 \le b \le 0.5$, $0 \le c \le 0.05$, and $0 \le \alpha \le 2$.

$$Li_aNi_bE_cG_dO_2 \quad \text{(Formula 10)}$$

In Formula 10, $0.90 \le a \le 1.1$, $0 \le b \le 0.9$, $0 \le c \le 0.5$, and $0.001 \le d \le 0.1$.

$$Li_aNi_bCo_cMn_dG_eO_2 \quad \text{(Formula 11)}$$

In Formula 11, $0.90 \le a \le 1.1$, $0 \le b \le 0.9$, $0 \le c \le 0.5$, $0 \le d \le 0.5$, and $0.001 \le e \le 0.1$.

$$Li_aNiG_bO_2 \quad \text{(Formula 12)}$$

In Formula 12, $0.90 \le a \le 1.1$ and $0.001 \le b \le 0.1$.

$$Li_aCoG_bO_2 \quad \text{(Formula 13)}$$

In Formula 13, $0.90 \le a \le 1.1$ and $0.001 \le b \le 0.1$.

$$Li_aMnG_bO_2 \quad \text{(Formula 14)}$$

In Formula 14, $0.90 \le a \le 1.1$ and $0.001 \le b \le 0.1$.

$$Li_aMn_2G_bO_4 \quad \text{(Formula 15)}$$

In Formula 15, $0.90 \le a \le 1.1$ and $0.001 \le b \le 0.1$.

$$QO_2 \quad \text{(Formula 16)}$$

$$QS_2 \quad \text{(Formula 17)}$$

$$LiQS_2 \quad \text{(Formula 18)}$$

$$V_2O_5 \quad \text{(Formula 19)}$$

$$LiV_2O_5 \quad \text{(Formula 20)}$$

$$LiIO_2 \quad \text{(Formula 21)}$$

$$LiNiVO_4 \quad \text{(Formula 22)}$$

$$Li_{3-f}J_2(PO_4)_3 \quad \text{(Formula 23)}$$

In Formula 23, $0 \le f \le 3$.

$$Li_{3-f}Fe_2(PO_4)_3 \quad \text{(Formula 24)}$$

In Formula 24, $0 \le f \le 2$.

In the above Formulas 1 to 24, A is selected from Ni, Co, Mn, and combinations thereof. B is selected from Al, Ni, Co, Mn, Cr, Fe, Mg, Sr, V, rare earth elements, and combinations thereof. D is selected from O, F, S, P, and combinations thereof. E is selected from Co, Mn, and combinations thereof. F is selected from F, S, P, and combinations thereof. G is a transition element or a lanthanide element selected from Al, Cr, Mn, Fe, Mg, La, Ce, Sr, V, and combinations thereof. Q is selected from Ti, Mo, Mn, and combinations thereof. I is selected from Cr, V, Fe, Sc, Y, and combinations thereof. Finally, J is selected from V, Cr, Mn, Co, Ni, Cu, and combinations thereof.

The positive electrode may be fabricated by first preparing a positive active material composition by mixing a positive active material, a binder, and a conductive material. The composition is then applied on a positive current collector such as aluminum.

According to one embodiment, a rechargeable lithium battery having the above structure includes from about 1 to about 20 volume % of a cyclic carbonate and shows improved cycle-life at high temperatures, storage at high temperatures, and high-rate characteristics. These improved characteristics are due to the improved thermal stability and cycle-life deterioration of the battery, which are achieved while maintaining high-rate characteristics even though the battery includes positive and negative electrodes having high active-mass densities.

FIG. 1 is a schematic cross-sectional view of a rechargeable lithium battery according to one embodiment of the present invention. Referring to FIG. 1, a rechargeable lithium battery 3 may be fabricated by first forming an electrode assembly 4 including a positive electrode 5, a negative electrode 6, and a separator 7 positioned between the positive electrode 5 and the negative electrode 6. The electrode assembly 4 is placed in a battery case 8 and an electrolyte is provided through an opening in the battery case 6. The case 8 is then sealed with a cap plate 11 and a gasket 12.

The following examples illustrate the present invention in more detail. These examples, however, are provided for illustrative purposes only and are not intended to limit the scope of the present invention.

Example 1

97.5 wt % of a graphite negative active material, 1.5 wt % of a polyvinylidene fluoride binder, and 1 wt % of a ketjen black conductive agent were dispersed into an N-methylpyrrolidone solvent, preparing a negative electrode slurry.

The negative electrode slurry was coated to a thickness of 150 μm on a Cu foil, preparing a thin electrode. The coated electrode was dried at 135° C. for 3 hours or more and then compressed to prepare a negative electrode. The negative electrode had an active mass density of 1.7 g/cc.

Next, 96 wt % of a $LiCoO_2$ positive active material, 2 wt % of a polyvinylidene fluoride binder, and 2 wt % of a ketjen black conductive agent were dispersed into an N-methylpyrrolidone solvent, preparing a positive electrode slurry. The positive electrode slurry was coated to a thickness of 151 μm on aluminum foil, preparing a thin electrode. The coated electrode was dried at 135° C. for 3 hours or more and then compressed, preparing a positive electrode. The prepared positive electrode had an active mass density of 3.7 g/cc.

19 volume % of ethylene carbonate, 45 volume % of ethylmethyl carbonate, and 36 volume % of dimethyl carbonate were mixed to prepare a non-aqueous organic solvent. Then, 1.5M $LiBF_4$ was dissolved in the non-aqueous organic solvent, preparing an electrolyte for a rechargeable lithium cell.

The negative and positive electrodes were spirally wound with a porous polypropylene separator film and then compressed together, preparing an electrode assembly. The electrode assembly was housed in a battery case, and thereafter the electrolyte was inserted into the case to prepare a rechargeable lithium cell. The electrolyte was included in an amount of 4.6 g.

Example 2

A rechargeable lithium cell was fabricated as in Example 1, except that 15 volume % of ethylene carbonate, 45 volume % of ethylmethyl carbonate, and 40 volume % of dimethyl carbonate was used as the non-aqueous organic solvent.

Example 3

A rechargeable lithium cell was fabricated as in Example 1, except that 10 volume % of ethylene carbonate, 45 volume % of ethylmethyl carbonate, and 45 volume % of dimethyl carbonate was used as the non-aqueous organic solvent.

Example 4

A rechargeable lithium cell was fabricated as in Example 1, except that 5 volume % of ethylene carbonate, 45 volume % of ethylmethyl carbonate, and 50 volume % of dimethyl carbonate was used as the non-aqueous organic solvent.

Example 5

A rechargeable lithium cell was fabricated as in Example 1, except that 1 volume % of ethylene carbonate, 45 volume % of ethylmethyl carbonate, and 54 volume % of dimethyl carbonate was used as the non-aqueous organic solvent.

Example 6

A rechargeable lithium cell was fabricated as in Example 1, except that the positive electrode had an active mass density of 3.75 g/cc.

Example 7

A rechargeable lithium cell was fabricated as in Example 3, except that the positive electrode had an active mass density of 3.8 g/cc.

Example 8

A rechargeable lithium cell was fabricated as in Example 5 except that the positive electrode had an active mass density of 3.85 g/cc.

Comparative Example 1

A rechargeable lithium cell was fabricated as in Example 1, except that the non-aqueous organic solvent was prepared by mixing ethylene carbonate and dimethyl carbonate in a volume ratio of 45:55.

Comparative Example 2

A rechargeable lithium cell was fabricated as in Example 1, except that the non-aqueous organic solvent was prepared by mixing 30 volume % of ethylene carbonate, 45 volume % of ethylmethyl carbonate, and 25 volume % of dimethylcarbonate.

Comparative Example 3

A rechargeable lithium cell was fabricated as in Example 1, except that the non-aqueous organic solvent was prepared by mixing 25 volume % of ethylene carbonate, 45 volume % of ethylmethyl carbonate, and 30 volume % of dimethyl carbonate.

Reference Example 1

A rechargeable lithium cell was fabricated as in Example 3, except that the positive electrode was prepared with an active mass density of 3.6 g/cc or less by lowering the loading amount of the positive electrode slurry.

Reference Example 2

A rechargeable lithium cell was fabricated as in Comparative Example 2, except that the positive electrode was prepared with an active mass density of 3.55 g/cc by lowering the loading amount of the positive electrode slurry.

High Temperature Cycle-Life Characteristic

The cycle-life characteristics at a high temperature of 60° C. of the rechargeable lithium cells prepared according to Examples 1 to 8 and Comparative Examples 1 to 3 were determined. After their first discharge, which is regarded as cell formation, the cells were repeatedly charged and discharged 60 times. When charged, they had a current density of 3.7 mA/cm$^2$ at each cycle. When first discharged, they had a current density of 3.7 mA/cm$^2$. The charge cut-off voltage was 4.35V.

The results of this cycle-life characteristic testing for the rechargeable lithium cells of Examples 1 to 5 and Comparative Examples 2 and 3 are indicated as a capacity retention ratio (%) based on initial capacity. The results are shown in the following Table 1.

TABLE 1

|  | Content of ethylene carbonate (EC) (volume %) | Capacity retention ratio (%) (60$^{th}$ cycle) |
| --- | --- | --- |
| Example 1 | 19 | 85 |
| Example 2 | 15 | 96 |
| Example 3 | 10 | 94 |
| Example 4 | 5 | 97 |
| Example 5 | 1 | 97 |
| Comparative Example 2 | 30 | 80 |
| Comparative Example 3 | 25 | 82 |

Referring to Table 1, the rechargeable lithium cells of Examples 1 to 5, included ethylene carbonate in an amount of 19 volume %, 15 volume %, 10 volume %, 5 volume %, and 1 volume %, respectively. These cells turned out to have high capacity retention (median of 94%) based on initial capacity after charging and discharging 60 times.

However, when ethylene carbonate was included in an amount of 30 volume % or 25 volume %, as in the rechargeable lithium batteries of Comparative Examples 2 and 3, respectively, the batteries had greatly decreased capacity retention based on initial capacity. In other words, when rechargeable lithium batteries with high active mass densities of about 3.7 g/cc or greater included an electrolyte including ethylene carbonate in an amount of from about 1 to about 20 volume %, they turned out to have much improved cycle-life characteristics at high temperatures.

Room Temperature Cycle-Life Characteristic

The cycle-life characteristics of the rechargeable lithium cells according to Examples 1 to 5 and Comparative Examples 1 to 3 were estimated after charging and discharging 40 times at room temperature (20° C.). The results are indicated as a capacity retention ratio (%) based on initial capacity in the following Table 2. The cells were repeatedly charged and discharged up to 40 times, after the first discharge (which is regarded as cell formation). The current density was 3.7 mA/cm$^2$ at every cycle during the charges and 3.7 mA/cm$^2$ at the first discharge. The charge cut-off voltage was 4.35V.

TABLE 2

|  | Content of ethylene carbonate (EC) (volume %) | Capacity retention ratio (%) (60$^{th}$ cycle) |
| --- | --- | --- |
| Example 1 | 19 | 95 |
| Example 2 | 15 | 95 |
| Example 3 | 10 | 95 |
| Example 4 | 5 | 96 |
| Example 5 | 1 | 96 |

TABLE 2-continued

| | Content of ethylene carbonate (EC) (volume %) | Capacity retention ratio (%) (60th cycle) |
|---|---|---|
| Comparative Example 1 | 45 | 95 |
| Comparative Example 2 | 30 | 95 |
| Comparative Example 3 | 25 | 95 |

As shown in Table 2, the rechargeable lithium battery cells of Examples 1 to 5 included ethylene carbonate in amounts of 19 volume %, 15 volume %, 10 volume %, 5 volume %, and 1 volume %, respectively. The rechargeable lithium battery cells of Comparative Examples 1 to 3 included ethylene carbonate in amounts of 45 volume %, 30 volume %, and 25 volume %, respectively. The cycle-life characteristics at room temperature of these cells were examined after charging and discharging 40 times. They all turned out to have similar cycle-life characteristics at room temperature.

High Rate Characteristic

A rechargeable lithium battery cell according to Example 3 was charged and discharged at charge and discharge rates of 0.2 C, 0.5 C, 1 C, 1.5 C and 2 C. The high rate characteristics of the cell were then examined. The results are shown in the following Table 3 and in FIG. 2.

Figure 2:
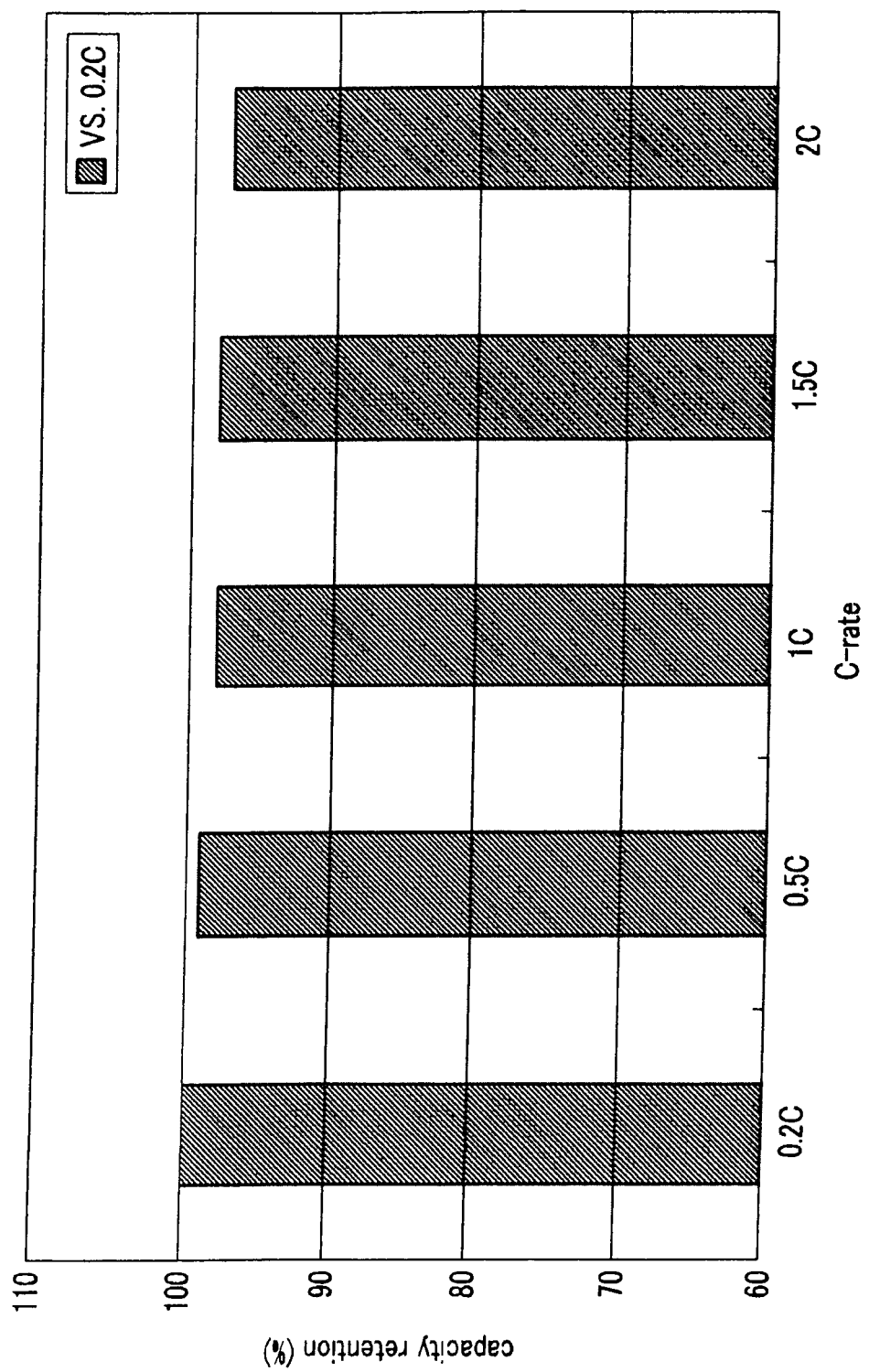
FIG. 2 is a graph of the high-rate characteristic of the rechargeable lithium battery cell prepared according to Example 3.

Referring to Table 3 and FIG. 2, the capacity retention ratio may be obtained based on 100% of the discharge capacity at a 0.2 C charge and discharge.

Referring to Table 3 and FIG. 2, a rechargeable lithium battery cell including ethylene carbonate in an amount of 10 volume % had high capacity retention ratios of 99% at 0.5 C, 98% at 1 C, and 98% at 1.5 C. The cell had a capacity retention ratio of 97% at a high rate of 2 C.

TABLE 3

| Charge and discharge rate | Capacity retention ratio (%) |
|---|---|
| 0.2 C | 100% |
| 0.5 C | 99% |
| 1 C | 98% |
| 1.5 C | 98% |
| 2 C | 97% |

Comparison of Cycle-Life Characteristics According to Active Mass Density

Figure 3:
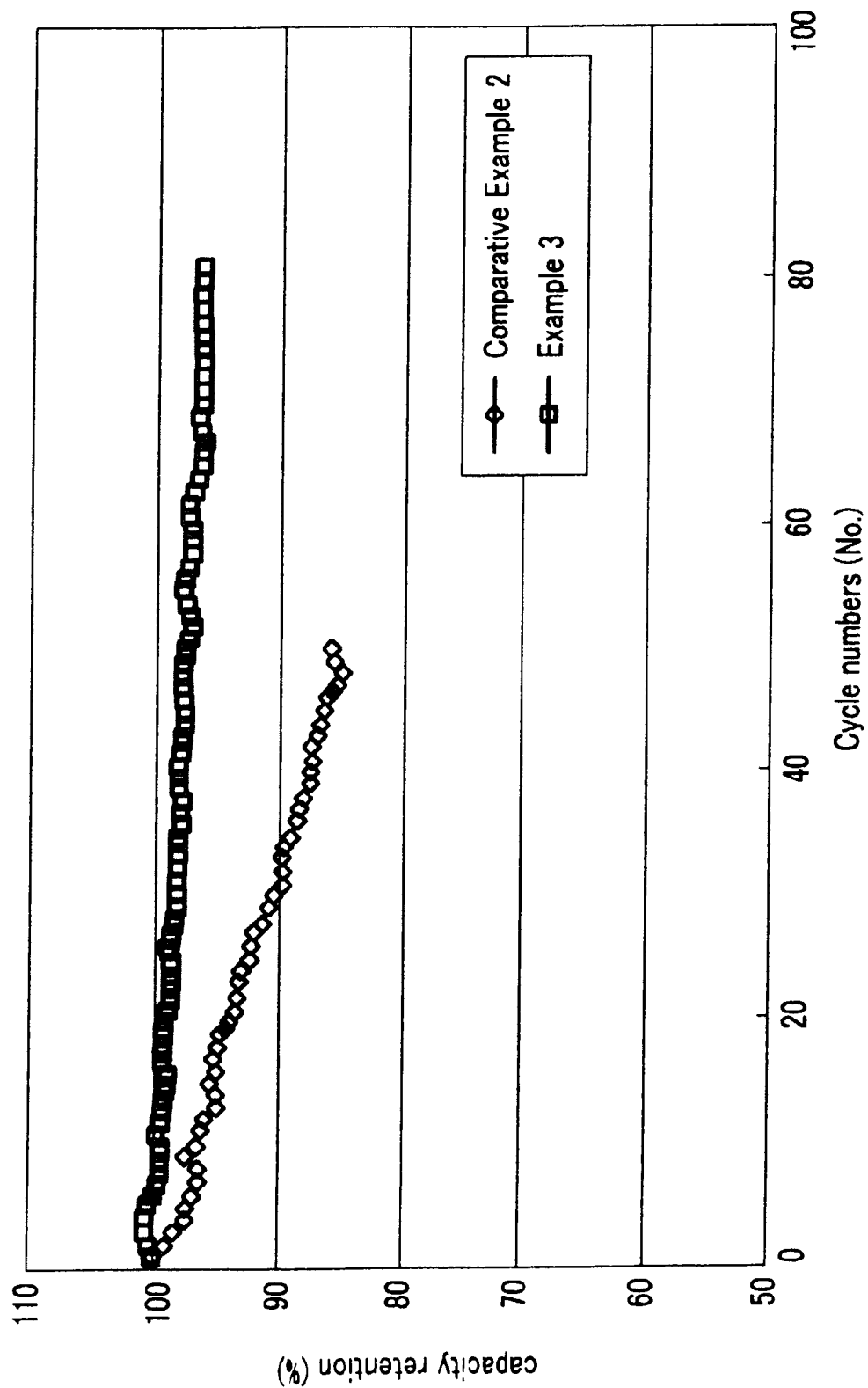
FIG. 3 is a graph of the cycle-life characteristics of the rechargeable lithium battery cells prepared according to Example 3 and Comparative Example 2.

Rechargeable lithium batteries according to Example 3, Comparative Example 2, and Reference Examples 1 and 2 were charged and discharged 50 times at 20° C. The capacity retention rates of these cells were then estimated. The results are shown in the following Table 4. The results of Example 3 and Comparative Example 2 are also shown in the graph of FIG. 3. The capacity retention rates in the following Table 4 were calculated based on an initial capacity of 100%. The rechargeable lithium batteries of Example 3, Comparative Example 2, Reference Example 1, and Reference Example 2 all had a current density of 3.7 mA/cm² during charge. The batteries had a charge cut-off voltage of 4.35V.

Referring to Table 4, the rechargeable lithium batteries of Reference Examples 1 and 2 having an active mass density of less than 3.7 g/cc turned out to have the same capacity retention rates regardless of the amount of ethylene carbonate. On the contrary, in comparing the rechargeable lithium batteries of Example 3 and Comparative Example 2, both having an active mass density of 3.7 g/cc, the battery of Example 3 including 10 volume % of ethylene carbonate as an electrolyte solution turned out to have much better cycle-life characteristics than the battery of Comparative Example 2 including 30 volume % of ethylene carbonate.

TABLE 4

| | Active mass density and cyclic carbonate content | Capacity retention ratio |
|---|---|---|
| Example 3 | positive electrode having active mass density of 3.7 g/cc and 10% EC | 97% |
| Reference Example 1 | positive electrode having active mass density of 3.6 g/cc and 10% EC | 94% |
| Comparative Example 2 | positive electrode having active mass density of 3.7 g/cc and 30% EC | 85% |
| Reference Example 2 | positive electrode having active mass density of 3.55 g/cc and 30% EC | 94% |

The rechargeable lithium batteries of the present invention show improved cycle-life and storage characteristics at high temperatures, and improved high rate characteristics.

While the present invention has been described with reference to certain exemplary embodiments, one of ordinary skill in the art will understand that various modifications and changes may be made to the described embodiments without departing from the spirit and scope of the present invention, as defined in the appended claims.

What is claimed is:

1. A rechargeable lithium battery comprising:
a negative electrode including a negative active material comprising a carbonaceous material;
a positive electrode including a positive active material comprising $LiCoO_2$;
the positive electrode having an active mass density of about 3.7 g/cc to about 4.2 g/cc; and
an electrolyte comprising a lithium salt and a non-aqueous organic solvent, the non-aqueous organic solvent comprising from about 5 to about 15 volume % of a cyclic carbonate and from about 85 to about 95 volume % of a linear carbonate, wherein the cyclic carbonate comprises a compound selected from the group consisting of ethylene carbonate, propylene carbonate, butylene carbonate, and mixtures thereof, and wherein the linear carbonate comprises a compound selected from the group consisting of dimethyl carbonate, diethyl carbonate, dipropyl carbonate, methylpropyl carbonate, ethylpropyl carbonate, methylethyl carbonate, ethylmethyl carbonate, and mixtures thereof.

2. The rechargeable lithium battery of claim 1, wherein the positive electrode has an active mass density ranging from about 3.7 to about 3.9 g/cc.

3. The rechargeable lithium battery of claim 1, wherein the negative electrode has an active mass density of about 1.5 g/cc to about 1.9 g/cc.

4. The rechargeable lithium battery of claim 1, wherein the rechargeable lithium battery has a charge cut-off voltage ranging from about 4.2 to about 4.5V.

5. The rechargeable lithium battery of claim 4, wherein the rechargeable lithium battery has a charge cut-off voltage ranging from about 4.3 to about 4.5V.

6. The rechargeable lithium battery of claim 1, wherein the cyclic carbonate is ethylene carbonate.

7. The rechargeable lithium battery of claim 1, wherein the linear carbonate comprises ethylmethyl carbonate and dimethyl carbonate.

8. The rechargeable lithium battery of claim 1, wherein the lithium salt comprises a compound selected from the group consisting of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, LiAlCl$_4$, LiN(C$_x$F$_{2x+1}$SO$_2$)(C$_y$F$_{2y+1}$SO$_2$) wherein x and y are natural numbers, LiCl, LiI, LiB(C$_2$O$_4$)$_2$ (lithium bis(oxalato) borate), and combinations thereof.

9. A rechargeable lithium battery comprising:
- a negative electrode including a negative active material comprising a carbonaceous material;
- a positive electrode having an active mass density of about 3.7 g/cc to about 4.2 g/cc and including a positive active material comprising LiCoO$_2$; and
- an electrolyte comprising a lithium salt and a non-aqueous organic solvent, the non-aqueous organic solvent comprising from about 5 to about 15 volume % of a cyclic carbonate and from about 85 to about 95 volume % of a linear carbonate, wherein the cyclic carbonate comprises a compound selected from the group consisting of ethylene carbonate, propylene carbonate, butylene carbonate, and mixtures thereof, and wherein the linear carbonate comprises a compound selected from the group consisting of dimethyl carbonate, diethyl carbonate, dipropyl carbonate, methylpropyl carbonate, ethylpropyl carbonate, methylethyl carbonate, ethylmethyl carbonate, and mixtures thereof,
- wherein the rechargeable lithium battery has a charge cut-off voltage ranging from about 4.2 to about 4.5V.

10. The rechargeable lithium battery of claim 9, wherein the rechargeable lithium battery has a charge cut-off voltage ranging from about 4.3 to about 4.5V.

11. The rechargeable lithium battery of claim 9, wherein the cyclic carbonate is ethylene carbonate.

12. The rechargeable lithium battery of claim 9, wherein the linear carbonate comprises ethylmethyl carbonate and dimethyl carbonate.

13. The rechargeable lithium battery of claim 9, wherein the lithium salt comprises a compound selected from the group consisting of LiPF$_6$, LiBF$_4$, LiSbF$_6$, LiAsF$_6$, LiCF$_3$SO$_3$, LiN(CF$_3$SO$_2$)$_3$, Li(CF$_3$SO$_2$)$_2$N, LiC$_4$F$_9$SO$_3$, LiClO$_4$, LiAlO$_4$, LiAlCl$_4$, LiN(C$_x$F$_{2x+1}$SO$_2$)(C$_y$F$_{2y+1}$SO$_2$) wherein x and y are natural numbers, LiCl, LiI, LiB(C$_2$O$_4$)$_2$ (lithium bis(oxalato) borate), and combinations thereof.

* * * * *